US012631290B2

(12) United States Patent    (10) Patent No.:   US 12,631,290 B2

Rohlfing et al.    (45) Date of Patent:    May 19, 2026

(54) SLAB SECUREMENT TOOLS, SYSTEMS, AND METHODS

(71) Applicant: Cambria Company LLC, Eden Prairie, MN (US)

(72) Inventors: Brian Andrew Rohlfing, Madison Lake, MN (US); Clark David Henry Minks, Saint Peter, MN (US); Michael Edward Toft, New Prague, MN (US); Anthony Dean Bjorklund, Mankato, MN (US); Oscar Juarez, Le Sueur, MN (US)

(73) Assignee: Cambria Company LLC, Eden Prairie, MN (US)

( * ) Notice: Subject to any disclaimer, the term of this patent is extended or adjusted under 35 U.S.C. 154(b) by 230 days.

(21) Appl. No.: 18/209,930

(22) Filed: Jun. 14, 2023

(65) Prior Publication Data

US 2024/0418312 A1    Dec. 19, 2024

(51) Int. Cl.
   *B25B 5/14*      (2006.01)
   *F16M 13/02*    (2006.01)

(52) U.S. Cl.
   CPC ................................. *F16M 13/022* (2013.01)

(58) Field of Classification Search
   CPC ..... E04G 21/167; B65G 49/062; B62B 3/108; B25B 5/145; F16M 13/022
   See application file for complete search history.

(56) References Cited

U.S. PATENT DOCUMENTS

| | | | | |
|---|---|---|---|---|
| 2,589,954 | A * | 3/1952 | Neil | E04G 21/167 |
| | | | | 29/469 |
| 2,828,869 | A * | 4/1958 | Corley | E04G 21/167 |
| | | | | 182/101 |
| 3,955,676 | A | 5/1976 | Hansen et al. | |
| 5,641,076 | A * | 6/1997 | Englund | B65G 49/062 |
| | | | | 206/454 |
| 6,062,781 | A | 5/2000 | Glaser | |
| 7,004,483 | B1 * | 2/2006 | McEntee | B62B 3/008 |
| | | | | 280/43.23 |
| 7,213,380 | B2 * | 5/2007 | Justice | E01C 23/121 |
| | | | | 52/749.1 |
| 7,325,817 | B1 * | 2/2008 | Jankowski | B62B 3/108 |
| | | | | 414/451 |
| 7,686,362 | B2 | 3/2010 | Layher | |
| 8,348,287 | B1 * | 1/2013 | Smith | B62B 3/108 |
| | | | | 280/47.35 |
| 10,226,684 | B2 * | 3/2019 | Collins | B23P 19/04 |
| 12,365,380 | B2 * | 7/2025 | Goldwitz | B62B 3/108 |
| 2006/0283663 | A1 * | 12/2006 | Fenner | E06C 5/02 |
| | | | | 182/127 |
| 2021/0131462 | A1 | 5/2021 | Gerard | |

FOREIGN PATENT DOCUMENTS

| | | |
|---|---|---|
| CN | 107380634 | 11/2017 |
| EP | 3029215 | 9/2017 |
| WO | WO 2014/140508 | 9/2014 |

* cited by examiner

*Primary Examiner* — Bradley Duckworth

(74) *Attorney, Agent, or Firm* — Fish & Richardson P.C.

(57)      ABSTRACT

Tools, systems, and methods of securing slabs, are described. Some example tools include a tool frame, a bracket, and an arm. The arm is adjustable relative to the tool frame and bracket into a slab-securing configuration in which an end portion of the arm is non-parallel with the bracket.

17 Claims, 11 Drawing Sheets

SLAB SECUREMENT TOOLS, SYSTEMS, AND METHODS

TECHNICAL FIELD

This document describes tools for securing slab products such as stone slab products, systems, and processes for securing slab products, for example, stone slabs suitable for use in living or working spaces (e.g., along a countertop, table, floor, or the like).

BACKGROUND

Slabs are a commonly used building material. Some slabs include stone materials such as granite, marble, soapstone, and other quarried stones that are often selected for use as countertops due to their aesthetic properties. Some slab materials are stored and transported in a generally upright position, and stone slabs can be stored and transported in a generally upright position along with several other stone slabs.

SUMMARY

Some embodiments described herein include tools, systems, and processes for securing one or more slabs to a support frame. For example, one or more slabs are supported by the support frame in an angled or non-horizontal orientation, such as a substantially upright position. A slab securement tool secures the one or more slabs to the support frame and maintains the one or more slabs in the substantially upright position. The slab securement tool connects to the support frame and the slab securement tool has an arm that extends around one or more slabs to maintain the one or more slabs in the substantially upright position.

In some optional embodiments, slab securement tools have a bracket configured to attach to a support frame and/or an arm that is adjustable and that extends from the bracket into a slab-securing configuration. For example, the arm can extend outwardly from the bracket to contact, and/or provide a barrier adjacent to, an outer surface of an outermost slab at the support frame to secure the outermost slab and one or more intermediate slabs to the support frame. In some embodiments, the bracket extends downwardly from a frame. Alternatively or additionally, the bracket includes a channel that is configured to connect to a portion of the support frame. In some embodiments, the arm has an end portion that is angled with respect to a first arm portion and the bracket. In some embodiments, the end portion is non-parallel with the bracket in the slab-securing configuration.

Some embodiments described herein include a stone slab securement tool for securing a stone slab to a stone slab support frame. The stone slab securement tool includes a tool frame, a bracket that extends downwardly from the tool frame, the bracket including a channel configured to connect to a portion of a stone slab support frame. The stone slab securement tool also includes an arm including a first arm portion that extends from the bracket in a direction transverse to the direction of the bracket and an end portion that is angled with respect to the first arm portion and the bracket, the arm adjustable relative to the tool frame and bracket into a slab-securing configuration in which the end portion is non-parallel with the bracket.

Implementations may include one or more of the following features. The end portion has an angle of about 45 degrees with respect to the first arm portion. The channel includes a first portion and a second portion, the second portion having a width that is less than a width of the first portion. The first portion of the channel is arranged at a non-zero angle with respect to an edge of the bracket. The second portion of the channel is arranged parallel to an edge of the bracket. The first arm portion includes a plurality of openings that are configured to receive a fastener. The stone slab securement tool includes a bar that extends through a bottom end of the bracket. The first arm portion extends at least partially through the aperture. The arm includes a plurality of openings spaced along a length of the arm. The stone slab securement tool includes a fastener configured to operably couple to at least one of the plurality of openings. The arm includes a second end portion that is angled with respect to the first arm portion and the bracket when in the slab-securing configuration.

Another example embodiment provides a method of securing one or more slabs to a support frame. The method includes receiving a cross bar of a support frame in a channel of a bracket of a slab securement tool, the slab securement tool including an arm that has a first arm portion that extends from the bracket in a direction transverse to the direction of the bracket and an end portion that is angled with respect to the first arm portion and the bracket. The method includes receiving a fastener in one of a plurality of openings in the first arm portion, thereby locking the arm of the slab securement tool.

Implementations may include one or more of the following features. The method includes actuating to an unlocked configuration in which the fastener is removed from one of a plurality of openings in the first portion of the arm. The method includes rotating the arm to release the end portion from an outer most slab of the one or more stone slabs. The end portion has an angle of about 45 degrees with respect to the first arm portion. The channel includes a first portion and a second portion, the second portion having a width that is less than a width of the first portion. The first portion of the channel is arranged at an angle with respect to an edge of the bracket.

Another example embodiment provides a stone slab securement tool for securing a stone slab to a stone slab support frame. The stone slab securement tool includes a tool frame and a bracket that extends downwardly from the tool frame, the bracket including a channel configured to connect to a portion of stone slab support frame. The stone slab securement tool includes two arms that extend from the tool frame at angles with respect to the tool frame.

Implementations may include one or more of the following features. The stone slab securement tool where arms each have an angle of about 45 degrees with respect to the tool frame. The arms extend at equal angles with respect to the tool frame.

The systems and techniques described here may provide one or more of the following advantages. First, some embodiments described herein include a slab securement tool that provides an intuitive, secure, and adjustable approach to securing a slab to a support frame. The tool can be readily affixed to a support frame to secure one or more slabs to the support frame. In various example embodiments, the tool facilitates efficient workflow by being easily secured to the support frame (e.g., by a single operator and/or by single-handed operation of the tool). For example, some securement tools can facilitate secure storage and efficient handling of slabs at an initial manufacturing location, fabrication location, storage location, indoor location, outdoor location, and/or display showroom location. In some embodiments, the tools are operable from a readily accessible position, such as at the top and/or front of a slab.

Second, some embodiments described herein facilitate versatile securement of a range of slab sizes and quantities. For example, the tool can be used to secure one slab or a plurality of slabs or different thicknesses and sizes to a support frame. The slab securement tool is positionable (e.g., and/or adjustable/extendable) to secure a plurality of slabs to a support frame. In some embodiments, the tool can be adjusted and locked into position to secure fewer slabs (e.g., as slabs are unloaded from the support frame). Alternatively or additionally, the slab securement tool is adjustable and/or lockable into position to secure additional slabs (e.g., as slabs are loaded to the support frame).

Third, some embodiments described herein include a slab securement tool that can facilitate efficient securement of one or more slabs to a support frame by a single operator and/or by singled-handed operation. For example, an operator can install the slab securement tool without the assistance of additional operators, facilitating efficient and user-friendly securement of one or more slabs to a support frame. In some example embodiments, a tool is readily manipulated between a first configuration in which a slab is secured to the support frame and a second configuration in which a slab is free to be loaded onto or unloaded from the support frame (e.g., by a single operator and/or by singled-handed operation of the tool).

Fourth, some embodiments described herein include a slab securement tool that provides robust security to a support frame holding one or more slabs of material. For example, the slab securement tool can extend over a top surface of each of the slabs at the support frame to contact, and/or provide a barrier adjacent to, an outermost slab and prevent rotation of the one or more slabs away from the support frame. In some examples, the tool provides a visually observable indicator that the one or more slabs are secured to the support frame (e.g., by a visible arm that extends over a front of an outermost slab).

The details of one or more implementations are set forth in the accompanying drawings and the description below. Other features and advantages will be apparent from the description and drawings, and from the claims.

DETAILED DESCRIPTION

In general, this document describes tools, systems, and processes for securing one or more slabs to a support frame. For example, some embodiments provide slab securement tools that have a bracket configured to attach to a support frame and an arm that extends from the bracket positionable relative a slab into a slab-securing configuration.

In some embodiments, the arm extends outwardly from the bracket to secure the outermost slab and any intermediate slabs to the support frame. For example, the arm has an end portion that is angled with respect to a first arm portion and the bracket. The end portion can be non-parallel with the bracket in the slab-securing configuration. In some embodiments, the bracket is configured to connect to a portion of the support frame. For example, the bracket extends downwardly from a frame of the slab-securement tool, and the bracket includes a frame engagement feature, such as an opening, that is configured to connect to a portion of the support frame. In some embodiments, the end portion is spaced away from an outer surface of an outermost slab such that rotation or movement of the outermost slab from the support frame is prevented (e.g., by the end portion). For example, in a secure configuration, a gap between about ⅛" and 6", ¼" and 4", or about ½" and 3" is present between the end portion and an outer surface of the outermost slab. Such a configuration provides a barrier that maintains a center of gravity of the slab at a location such that the slab remains biased towards the support frame. For example, the barrier prevents rotation of a slab away from the support frame by a magnitude that would result in gravitational forces inducing further outward rotation of the slab away from the support frame. Alternatively or additionally, the end portion can be positioned to maintain contact with an outer surface of the outermost slab (e.g., such that no gap is present between the end portion and the outer surface of the outermost slab).

Figure 1:
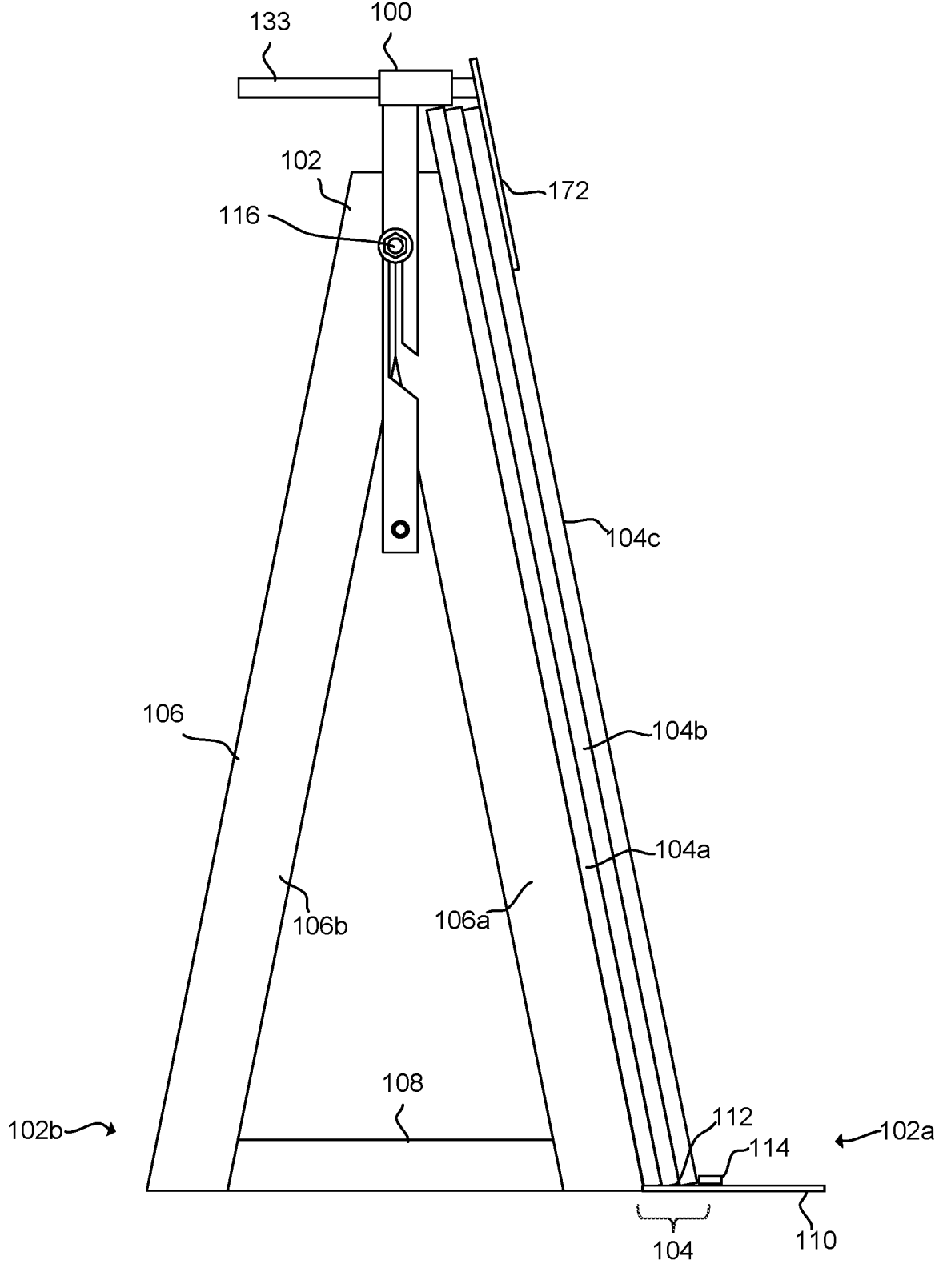
FIG. 1 is a side view of an example slab securement tool connected to a support frame, in accordance with some embodiments.

Referring to FIG. 1, an example slab-securement tool 100 configured to connect to a support frame 102 and secure one or more slabs 104 to the support frame 102 is shown. The slab-securement tool 100 is removably attachable to the support frame 102 and the plurality of slabs 104 to facilitate adjustable securement of the plurality of slabs 104 to the support frame 102.

The support frame 102 is configured to support the plurality of slabs 104 at either side 102*a*, 102*b* of the support frame 102. In some embodiments, the support frame 102 supports the plurality of slabs 104 on both sides 102*a*, 102*b* simultaneously. In examples that include a plurality of slabs 104, an inner most slab 104*a* contacts the support frame 102, and each respective slab outward from the inner most slab (e.g., slabs 104*b*, 104*c*) is supported by the next inner most slab. The plurality slabs 104 are arranged at an angle to lean the plurality of slabs 104 against the support frame 102. In some embodiments, the support frame 102 supports one slab, two slabs, and a plurality of slabs 104 on each side 102*a*, 102*b* of the support frame 102.

The plurality of slabs 104 can include slabs of a variety of materials including stone, glass, wood, metal, plastic, ceramic, or any other slab material. For example, some slabs include stone materials such as granite, marble, soapstone, and other quarried stones that are often selected for use as countertops due to their aesthetic properties.

The support frame 102 provides a support for one or more slabs in an angled or non-horizontal orientation, such as a substantially upright position. For example, the support frame 102 has one or more A-frames 106 that include two similarly sized beams 106a, 106b. The A-frames 106 are arranged in an angle of about 45 degrees or less, and the similarly sized beams 106a, 106b are attached at the top and disconnected at the bottom to form the A-frame 106 shape generally as an uppercase letter 'A'. In some embodiments, each of the beams 106a, 106b of each A-frame 106 are connected between each side 102a, 102b by base members 108. Some embodiments include a platform 110 that extends from or near the base members 108. A bottom surface 112 of each of the plurality of slabs 104 is supported by the platform 110. In some embodiments, the platform 110 can include a cleat 114 at the platform 110 that can constrain the bottom surface 112 of the plurality of slabs 104 from movement, rotation, or slip away from the support frame 102. A cross bar 116 extends across the support frame 102 to connect each of the A-frames 106 to each other to form the support frame 102. The cross bar 116 extends through and connects to a top of each A-frame 106 where the beams 106a, 106b connect to each other.

Figure 2:
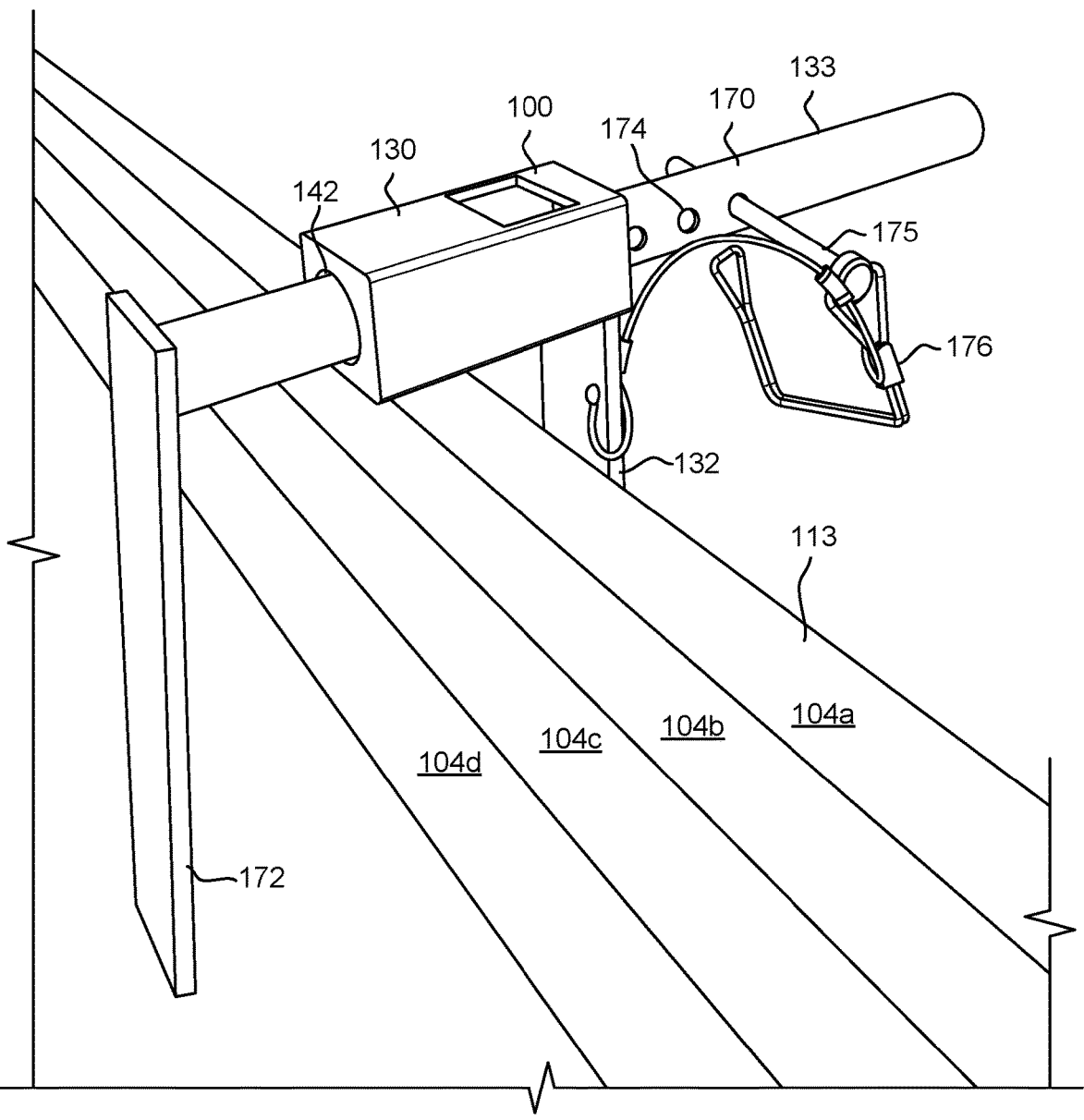
FIG. 2 is a perspective view of the example slab-securement tool of FIG. 1, in accordance with some embodiments.

Referring to FIGS. 1 and 2, the slab securement tool 100 constrains the plurality of slabs 104 against outward movement away from the support frame 102. For example, the slab securement tool 100 constrains or limits the slabs (e.g., outer most slab such as slab 104c in FIG. 1 or slab 104d in FIG. 2) against outward movement from the support frame 102. In some embodiments, the slab securement tool 100 is spaced from the slabs 104 (e.g., spaced from an outer surface of an outermost slab) and contacts the outer most slab (e.g., slab 104c in FIG. 1 or slab 104d in FIG. 2) in the event the slab were to move outwardly away from the support frame 102. Alternatively or additionally, the slab securement tool 100 contacts the outer most slab to constrain the plurality of slabs 104 against outward movement away from the support frame 102 (e.g., and is maintained in contact with the outer most slab 104 when in a secure configuration). In some embodiments, a cleat 114 prevents the outer most slab (e.g., slab 104c or 104d) from movement, rotation, or slip away from the support frame 102 (e.g. at a lower or bottom portion of support frame 102 that the slabs rest on).

Figure 3:
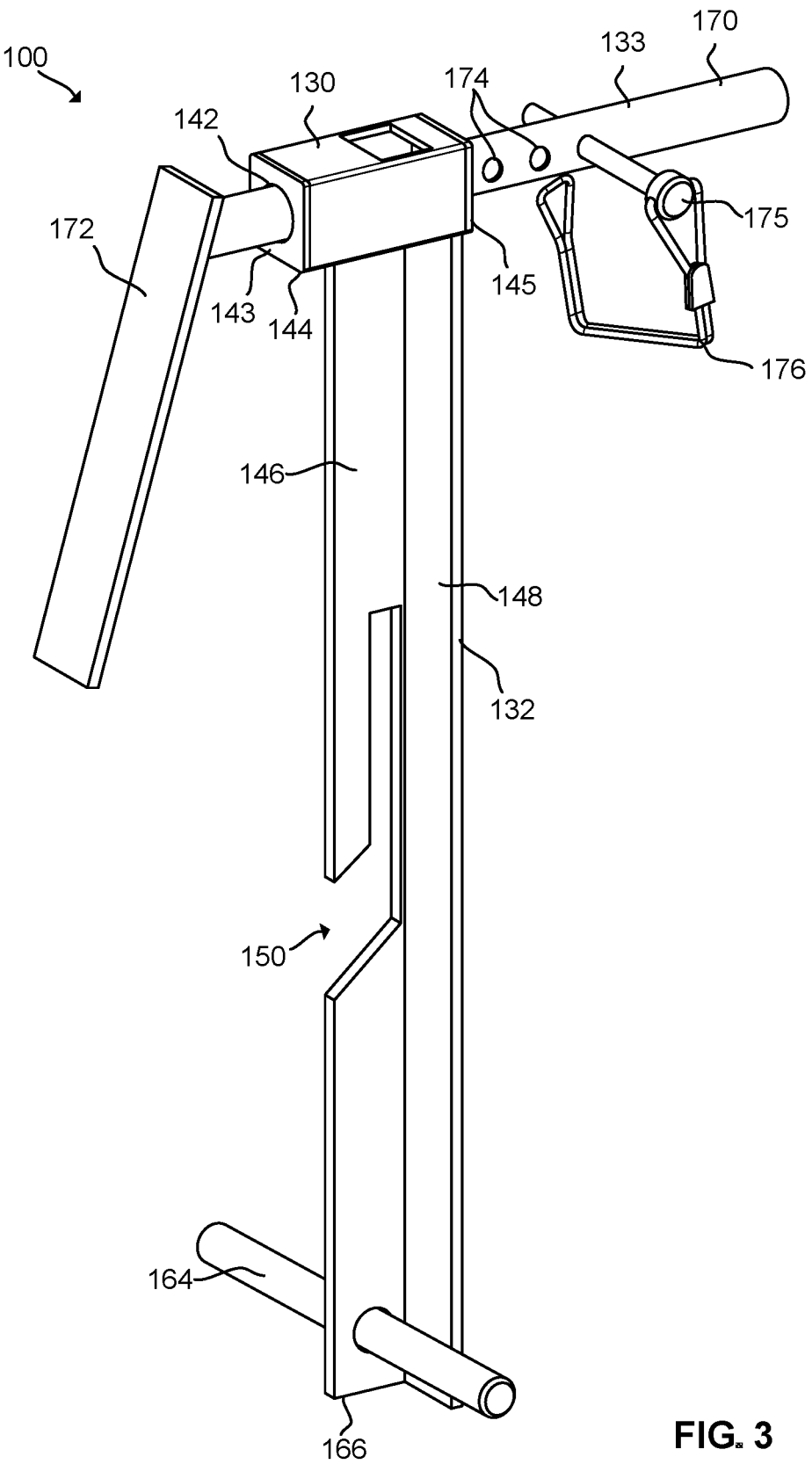
FIG. 3 is a perspective view of the slab securement tool of FIG. 1, in accordance with some embodiments.
Figure 4:
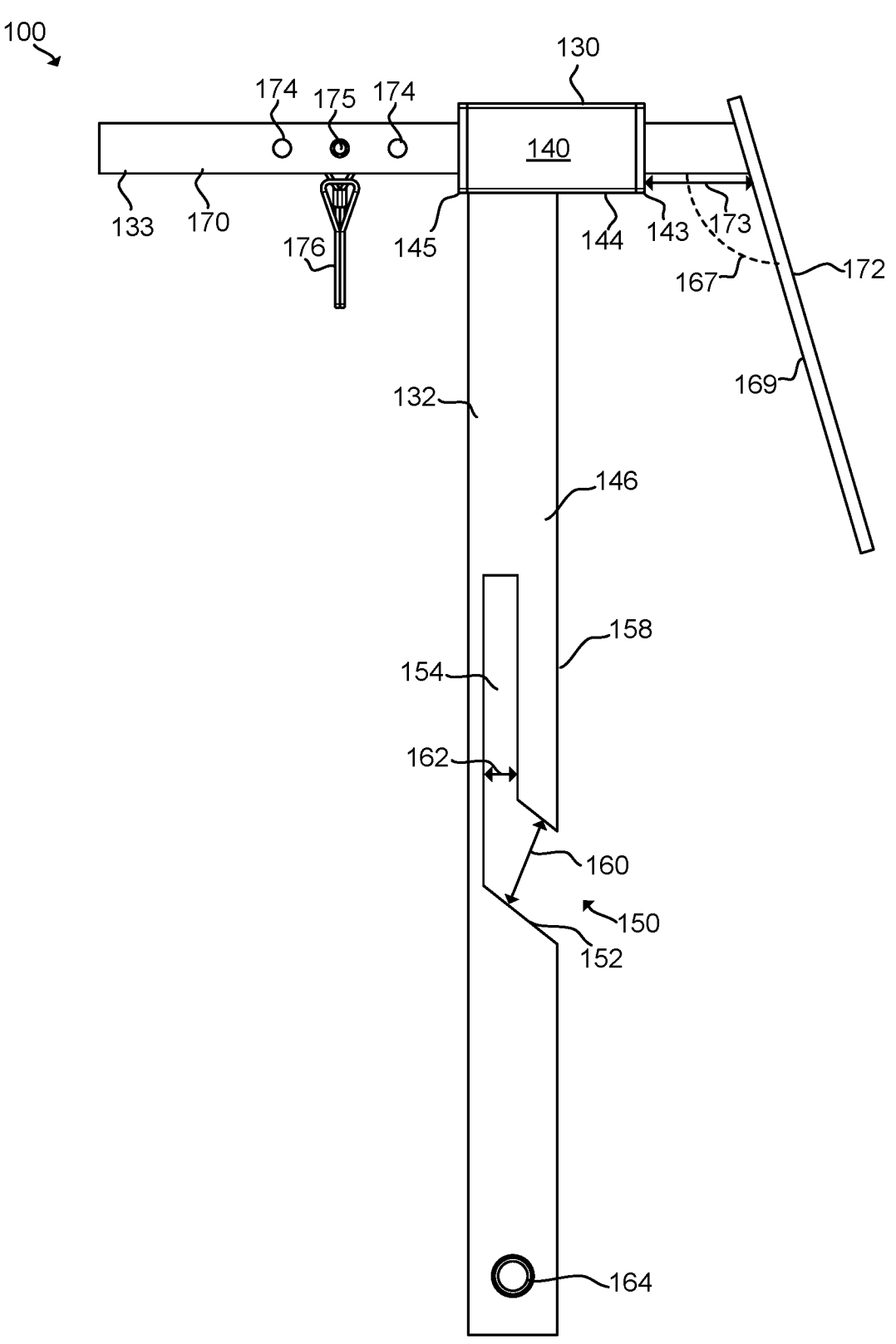
FIG. 4 is a side view of the slab securement tool of FIG. 3.

Referring to FIGS. 3 and 4, a perspective view of the slab securement tool 100 is shown, including features that facilitate securement of the plurality of slabs 104 to the support frame 102. The slab securement tool 100 includes a frame 130, a bracket 132 that extends from the frame 130, and an arm 133 that extends from the bracket 132 in a direction transverse to the direction of the bracket 132.

The frame 130 includes a housing 140 that defines an aperture 142 that is configured to receive the arm 133. The aperture 142 extends from a first end 143 to a second end 145 of the housing 140. The arm 133 extends through the aperture 142 from the first end 143 to the second end 145. The frame 130 is arranged transverse to the bracket 132 at an end of the bracket 132. In some example embodiments, the frame 130 extends above a top surface 113 of at least one of the plurality of slabs (e.g., inner most slab 104a). A bottom surface 144 of the housing 140 can include a recess or padding to facilitate added clearance and protection for the plurality of slabs that are secured by the slab securement tool 100. In some embodiments, the frame 130 is integral with the bracket 132 (e.g., formed at a top end of the bracket 132) and receives the arm 133. Such a configuration can facilitate ease of manufacturing of the slab securement tool 100 and an integral connection between the arm 133 and the bracket 132.

The bracket 132 extends from the frame 130 and is configured to connect the slab securement tool 100 to a portion of the support frame 102. The bracket 132 is arranged transverse to the frame 130. In an installed configuration (see e.g., FIGS. 1 and 2), the bracket 132 extends downwardly away from the bottom surface 144 of the frame 130. For example, the bracket 132 is entirely below the frame 130 (e.g., entirely below the bottom surface 144). The bracket 132 includes a first plate 146 and a second plate 148 that are arranged orthogonal to each other. In some embodiments, the first plate 146 and the second plate 148 are arranged in an L-shape where the first plate 146 extends from the second end 145 of the frame 130 towards the first end 143 of the frame. Such a configuration can provide a robust bracket 132 that has a high strength and that resists bending in multiple directions. The second plate 148 extends downwardly from the second end 145 of the frame. In some embodiments, the second plate 148 and the second end 145 are aligned with each other.

In some embodiments, the first plate 146 of the bracket 132 includes an opening that is configured to connect to a portion of the support frame 102. For example, the opening includes a channel 150 is configured to receive and connect to the cross bar 116 (see e.g., FIGS. 1 and 5). The channel 150 includes a first portion 152 and a second portion 154, such as portions that allow the channel 150 to first receive the cross bar 116 (e.g., first portion 152) and then to slide into an engaged position over the cross bar 116 (e.g., second portion 154). The first portion 152 is arranged at an angle with respect to an edge 158 of the first plate 146. In some embodiments, the angle of the first portion 152 of the channel 150 is between 0 and 90 degrees, between 10 and 80 degrees, between 20 and 70 degrees, between 30 and 60 degrees, between 40 and 50 degrees, or about 45 degrees. The second portion 154 is arranged parallel to the edge 158 of the first plate 146. The first portion 152 of the channel 150 has a width 160, and the second portion 154 of the channel 150 has a width. In some embodiments, the width 160 is greater than the width 162. For example, a ratio of the width 160 to the width 162 can be 1.5:1, 2:1, 3:1, or 4:1. Such a ratio facilitates easily positioning the slab securement tool 100 onto the support frame 102 by providing a wider and/or larger first portion 152 to initially receive a portion of the support frame 102 (e.g., the cross bar 116), and a smaller second portion 154 to retain the slab securement tool 100 in a desired position relative to the support frame 102 (e.g., relative to the crossbar 116 of the support frame 102)

In some embodiments, the slab securement tool 100 includes a rotational restraint that prevents rotation of the slab securement tool 100 in the installed position and facilitates securement of the plurality of slabs. For example, the slab securement tool 100 includes a bar 164 that extends through the first plate 146. The bar 164 is positioned at or near a bottom end 166 of the first plate 146. In some embodiments, the bar 164 is symmetrical on each side of the first plate 146, where the bar 164 extends equal distances on each side of the first plate 146. In some examples, the bar 164 is asymmetrical and has a length that is greater on one side of the first plate 146. As shown in the installed configuration of FIG. 6, the bar 164 extends from the bracket 132 and between the beams 106a, 106b. The bar 164 facilitates a rotational restraint on the slab securement tool 100 in the installed position, thereby preventing rotation of the slab securement tool 100 and facilitating securement of the plurality of slabs.

The length of bar 164 facilitates securement and rotational restraint relative to the support frame 102 while promoting ready installation and removal from the support frame 102. In various example embodiments, the length of bar 164 is between 4 in. and 18 in., 6 in. and 14 in., 8 in. and 12 in., or about 10 in.

In various example embodiments, slab securement tool 100 includes an actuatable member that is actuatable between an engaged configuration (e.g., slab-securing configuration) and a disengaged configuration (e.g., to facilitate installation and removal from a support frame). In an example embodiment, slab securement tool 100 includes an actuatable bar 164. The bar 164 is in a disengaged configuration when the slab securement tool 100 is installed on the support from. In the disengaged configuration the actuatable bar 164 extends in a generally longitudinal direction (e.g., parallel with the bracket 132). When positioned on the support frame, the bar 164 is actuated into the engaged configuration such that the bar 164 extends transverse to the bracket 132, such as generally perpendicular to the bracket 132. In some embodiments, the bar 164 is actuated by a hinge and/or spring-loaded mechanism. A user can position the slab securement tool in a desired position on support frame 102, and actuate the mechanism to shift the bar 164 from the disengaged configuration to the engaged configuration.

The slab securement tool 100 includes one or more engagement indicators. In some embodiments, the slab securement tool 100 includes a visual and/or tactile indicator that provides feedback to a user or observer that the slab securement tool 100 is engaged with a support frame (e.g., the slab securement tool 100 is in the slab-securing configuration to prevent rotation or movement of a slab away from the support frame). For example, the slab securement tool 100 includes a light or colored indicator that is activated/exposed when the slab securement tool is in the slab-securing configuration, and not activated/exposed when the slab securement tool is not in the slab-securing configuration. Alternatively or additionally, the slab securement tool 100 includes a tactile (e.g., clicking) indicator that is actuated when the slab securement tool 100 is brought into the slab-securing configuration during engagement with the support frame. In some embodiments, engagement with the support frame (e.g., such that bar 164 is in an engaged position with the support frame) causes the indicator to toggle from a disengaged indicator to an engaged (e.g., slab-securing configuration) indicator. The engagement may trigger a mechanical indicator, electrical switch, etc., to provide a visual indicator to the user/observer.

The slab securement tool 100 includes an arm 133 that extends to contact and/or constrain an outermost slab (e.g., slab 104c in FIG. 1 or slab 104d in FIG. 2). In some embodiments, the arm 133 includes a first arm portion 170 and an end portion 172. The first arm portion 170 extends from the bracket 132 and the frame 130 in a direction transverse to the direction of the bracket 132. The first arm portion 170 extends through the aperture 142 from the first end 143 to the second end 145 of the housing 140. In some embodiments, the first arm portion 170 includes a limit feature 179, such as an enlarged end region, rib, through-bolt, etc., that prevents first arm portion 170 from sliding out of frame 130 (e.g., during handling of slab securement tool 100 when not in a slab-securing configuration). The limit feature 179 is located at an end region of first arm portion 170 (e.g., opposite end portion 172).

In some embodiments, the first arm portion 170 has a cylindrical shape such as a bar or a tube. In other embodiments, the first arm portion 170 has a relatively more squared-off shape. In such embodiments, the aperture 142 is of a correspondingly squared off-shape. The end portion 172 is angled with respect to the first arm portion 170, the bracket 132, and the frame 130.

The end portion 172 extends from the first arm portion 170 at an angle 167. In some embodiments, the angle 167 is between 0 and 90 degrees, between 10 and 80 degrees, between 20 and 70 degrees, between 30 and 60 degrees, between 40 and 50 degrees, between 30 and 50 degrees, between 40 and 60 degrees, or about 45 degrees. For example, the angle 167 is approximately the same as an angle that a slab is oriented when positioned on a support frame, and/or may be approximately the same as angle of an A-frame support leg of the support frame (e.g., when in an engaged configuration with a support frame, the angle 167 may be approximately the same as a major surface of a slab on the support frame and/or an A-frame support leg of the support frame.

In some embodiments, the end portion 172 extends to a length that is between 3 and 20 inches, between 4 and 15 inches, between 5 and 10 inches, or about 8 inches. In some embodiments, such lengths facilitate reliable securement of a slab on the support frame while being easily handled and manipulated by an operator. An inner surface 169 of the end portion 172 is configured to contact and/or constrain an outer surface of the outer most slab (e.g., slab 104c in FIG. 1 or slab 104d in FIG. 2). The inner surface 169 can include padding to facilitate protection for the plurality of slabs that are secured by the slab securement tool 100.

The arm 133 is adjustable relative to the frame 130 and the bracket 132. For example, the arm 133 is translatable within the aperture 142 to extend the end portion 172 further from the frame 130 and the bracket 132 and to retract the end portion 172 nearer to the frame and the bracket 132. The arm 133 is lockable and adjustable to a plurality of positions. For example, the arm 133 can include a distance 173 from the first end 143 of the housing 140 that is adjustable between 1 cm and 50 cm, between 1 cm and 40 cm, between 1 cm and 30 cm, between 1 cm and 20 cm, and between 1 cm and 15 cm. The ranges of distance 173 facilitate versatile securement of a range of slab sizes and quantities including one slab or a plurality of slabs or different thicknesses and sizes to a support frame. In some embodiments, the tool is adjustable and lockable into position to secure fewer slabs (e.g., as slabs are unloaded from the support frame). Alternatively or additionally, the slab securement tool is adjustable and/or lockable into position to secure additional slabs (e.g., as slabs are loaded to the support frame).

In some embodiments, the first portion 170 of the arm 133 includes a plurality of openings 174 spaced apart along the length of the first portion 170. The plurality of openings 174 extend through the first portion 170. The plurality of openings 174 are spaced apart along the length of the first portion 170 of the arm 133 to facilitate a plurality of lockable positions for the arm 133. For example, the plurality of openings 174 are spaced apart at 0.25 inch increments, at 0.5 inch increments, at 0.75 inch increments, at 1 inch increments, at 2 inch increments, or at other increments along the length of the first portion 170 of the arm 133. The ranges of spacing for the plurality of openings facilitate versatile securement of a range of slab sizes and quantities including one slab or a plurality of slabs or different thicknesses and sizes to a support frame.

Each opening of the plurality of openings 174 is configured to receive a fastener 175 through the opening 174 to lock the arm 133 in position. In some embodiments, the fastener 175 is a pin that has a lock 176 that connects each side of the fastener 175 to ensure the fastener 175 remains in the selected opening 174. Other embodiments of the fastener 175 can include one or more pipe clamps, chains, screws, adhesives, or other fasteners. The fastener 175 prevents translation of the arm 133 outward. For example, the arm 133 is adjustable to a desired position and the fastener 175 is attached to a selected opening 174. With the fastener 175 attached, the end portion 172 is prevented from translating further away from the frame 130 and the bracket 132. In a locked position with the fastener 175 attached to one of the openings 174, the distance 173 is prevented from increasing.

The arm 133 is rotatable within the aperture 142. For example, the arm 133 is rotatable from the position shown in FIG. 2 with the end portion 172 oriented in a generally downward direction (while maintaining the angle 167) and in contact with, and/or slighted spaced from, the outer most slab 104d. The arm 133 is rotatable so the end portion 172 can release contact, and/or provide additional clearance, between the end portion 172 and the outer most slab 104d. For example, the arm 133 is rotatable approximately 360 degrees in the clockwise direction, and approximately 360 degrees in the counter-clockwise direction. In use, the end portion 172 can release contact with the outer most slab 104d once the end portion 172 is approximately 90 degrees (clockwise or counter-clockwise) from the downward direction in FIG. 2. In some embodiments, the end portion 172 can be oriented in a generally upright direction (e.g. more than 90 degrees to approximately 180 degrees from the embodiment shown in FIG. 2) to allow slabs to be removed from the support frame 102 (slab 104d in FIG. 2). Likewise, the end portion 172 can be oriented in the generally upright direction to add to the plurality of slabs 104 on the support frame 102. In some embodiments, rotation of the arm 133 can be locked by the fastener 175. In other embodiments, the arm 175 can be free to rotate with the fastener 175 attached.

Figure 5:
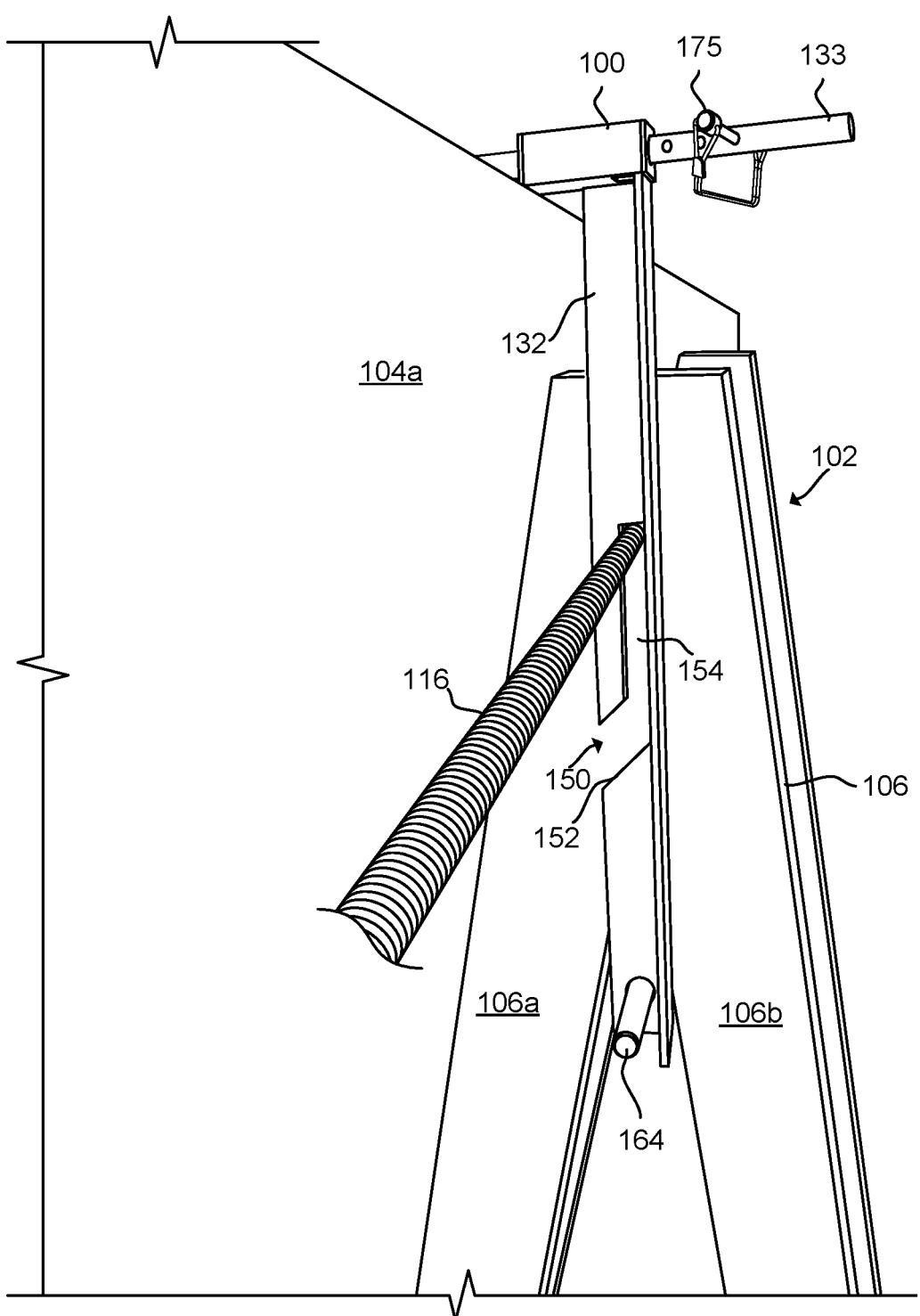
FIG. 5 is a perspective view of a slab securement tool connected to a support frame, in accordance with some embodiments.
Figure 6:
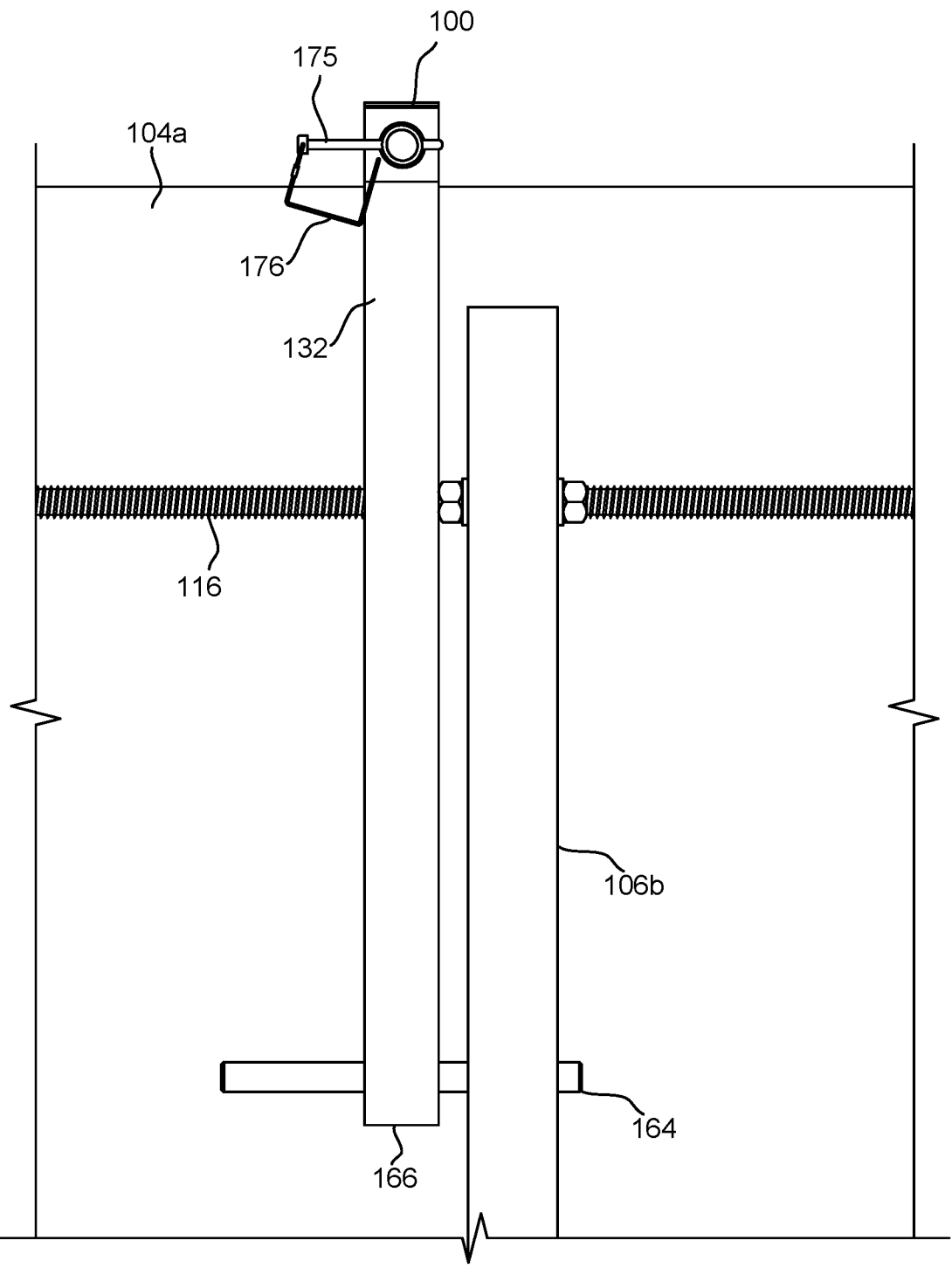
FIG. 6 is a rear view of the slab securement tool of FIG. 5.

Referring to FIGS. 5 and 6, embodiments of the slab securement tool 100 are attachable to the support frame 102. The support frame 102 includes the cross bar 116 that extends across the support frame 102 to connect each of the A-frames 106 to each other to form the support frame 102. The cross bar 116 extends through and connects to a top of each A-frame 106 where the beams 106a, 106b connect to each other. The channel 150 is configured to receive and connect to the cross bar 116. For example, the cross bar 116 can be inserted into the first portion 152 of the channel 150 during attachment of the slab securement tool 100 to the support frame 102. The cross bar 116 is advanced from the first portion 152 to the second portion 154 to secure the slab securement tool 100 to the support frame 102.

The bar 164 extends from the bracket 132 and between the beams 106a, 106b. The bar 164 facilitates a rotational restraint on the slab securement tool 100 in the installed position, thereby preventing rotation of the slab securement tool 100 and facilitating securement of the plurality of slabs to the support frame 102. The slab securement tool 100 restricts the plurality of slabs 104 from rotating away from the support frame 102 and maintaining a center of gravity of the slabs at a location such that the slabs remain supported on the support frame 102. For example, the bar 164 contacts either of the beams 106a, 106b to restrict rotation of the slab securement tool 100 in response to rotational forces applied to the slab securement tool 100 (e.g., tipping of one or more of the plurality of slabs 104).

The slab securement tool 100 facilitates reduced or no force on the slab securement tool 100 when the slab securement tool 100 is in the secured position. For example, the end portion 172 of the arm 133 is adjusted to be slightly spaced from an outer surface of the outer most slab (e.g., slab 104c in FIG. 1 or slab 104d in FIG. 2) while the outer most slab is generally upright. In some embodiments, the end portion 172 is spaced away from an outer surface of an outermost slab such that rotation or movement of the outermost slab from the support frame is prevented by the end portion 172. Little or no force is exerted on the end portion 172, and the end portion constrains outward movement of the slabs 104 away from the support frame. For example, in a secure configuration, a gap between about ⅛" and 6", ¼" and 4", or about ½" and 3" is present between the end portion 172 and an outer surface of the outermost slab. Alternatively or additionally, the end portion 172 can be positioned to maintain contact with an outer surface of the outermost slab (e.g., such that no gap is present between the end portion and the outer surface of the outermost slab). In some embodiments, little or no force is exerted on the end portion 172 by the slab 104, and the weight of the slabs 104 is supported by the support frame 102.

While the slab securement tool 100 is in the secured position with the outermost slab generally upright, the slab securement tool 100 facilitates reduced or no forces on the end portion 172 of the arm 133 and facilitates support of the one or more slabs by the support frame 102. In some embodiments of the secured position, the slab securement tool 100 facilitates that no forces are exerted by the one or more slabs on the end portion 172 of the arm 133. The construction of the slab securement tool 100 includes a relatively lightweight construction, while maintaining the securement abilities described herein. The slab securement tool 100 is generally not loaded (e.g., such that forces from the slabs 104 are exerted on the end portion 172 or other portions of the slab securement tool 100) when in the secured configuration. For example, the weight of the slabs are supported by the support frame 102.

In some embodiments, a single slab securement tool 100 secures the plurality of slabs 104 to the support frame 102. For example, the slab securement tool 100 can be positioned around a central portion of the plurality of slabs 104 and the support frame 102. Additionally, the slab securement tool 100 can be positioned around either side of the support frame 102 and anywhere along the length of the support frame 102. Two or more slab securement tools 100 can be used together to secure the plurality of slabs 104 to one side or to both sides of the support frame 102.

In some embodiments, the slab securement tool 100 secures the plurality of slabs 104 to the support frame 102. In operation, one or more slabs (e.g., the plurality of slabs 104) are positioned at the support frame 102. The support frame 102 provides a support for one or more slabs in an angled or non-horizontal orientation, such as a substantially upright position. The slab securement tool 100 is operable from a readily accessible position, such as at the top and/or front of the plurality of slabs 104. The slab securement tool 100 is oriented to receive the cross bar 116 in the channel 150 to connect the bracket 132 to the support frame 102. For example, the slab securement tool 100 is rotated or tilted to align the first portion 152 of the channel with the cross bar 116 to facilitate insertion of the cross bar 116 into the channel 150. The slab securement tool 100 is adjusted (i.e., rotated, tilted, advanced) to position the cross bar 116 in the second portion 154 of the channel 150. In the installed position, the cross bar 116 is positioned at or near a top end of the second portion 154 of the channel 150.

The arm 133 is adjustable to extend the outer portion 172 of the arm 133 around an outermost slab (e.g., slab 104c in FIG. 1 or slab 104d in FIG. 2). The arm 133 is lockable and adjustable to a plurality of positions by adjusting the distance 173. The distance 173 is adjustable to facilitate versatile securement of a range of slab sizes and quantities including one slab or a plurality of slabs or different thicknesses and sizes to the support frame 102. To lock the arm 133 into a position, the fastener 175 is inserted into one of the plurality of openings 174 to secure the arm 133 in the locked position and lock the distance 173. Removing the fastener 175 from the plurality of openings 174 unlocks the arm 133 and adjustment of the arm 173 is permitted.

In some embodiments, the slab securement tool 100 is adjustable and lockable into position to secure fewer slabs (e.g., as slabs are unloaded from the support frame). Alternatively or additionally, the slab securement tool 100 is adjustable and/or lockable into position to secure additional slabs (e.g., as slabs are loaded to the support frame). For example, the arm 133 is rotatable from the position shown in FIG. 2 with the end portion 172 oriented in a generally downward direction (while maintaining the angle 167) and in contact with, and/or slightly spaced from, the outer most slab 104d. The arm 133 is rotatable so the end portion 172 is oriented in a generally upright direction (e.g., approximately 180 degrees from the embodiment shown in FIG. 2) to release contact and/or provide additional clearance between the end portion 172 and the outer most slab 104d. With the first end portion 172 rotated in a generally upright direction, the slabs 104a-104c can be removed from the support frame 102 or additional slabs can be added to the first side 102a. In some embodiments, rotation of the arm 133 can be locked by the fastener 175. In other embodiments, the arm 175 can be free to rotate with the fastener 175 attached. In some embodiments, the arm 133 is biased to return to the secured configuration (e.g., with the end portion 172 oriented in a generally downward direction). For example, the end portion 172 of the arm 133 is biased by gravity that acts on the end portion 172 to return end portion 172 of the arm 133 generally downward.

In some embodiments, the slab securement tool 100 includes one or more materials. For example, the slab securement tool 100 includes one of aluminum, iron, steel, plastic, carbon fiber, or combinations thereof. The slab securement tool 100 is formable using a variety of techniques including stamping, 3D printing, molding, welding, and/or lathing. For example, one or more components of slab securement tool 100 can be formed individually (e.g., and joined by welding, bonding, etc.), and/or integrally formed as a unitary component or collection of unitary components. In some embodiments, the slab securement tool 100 includes aluminum to facilitate a lightweight and readily formable structure that is resistant to corrosion while maintaining strength to secure one or more slabs to the support frame 102. In some embodiments, the slab securement tool 100 includes steel to facilitate manufacturability (e.g., via stamping, 3D printing, welding, lathing) of a weighted structure that provides strength to secure one or more slabs to the support frame 102. In some embodiments, the slab securement tool 100 includes plastic to facilitate a lightweight and readily formable (e.g., via molding, 3D printing, welding, lathing) structure that is resistant to corrosion while maintaining strength to secure one or more slabs to the support frame 102. In some embodiments, the slab securement tool 100 includes carbon fiber to facilitate a lightweight structure that is resistant to corrosion and having strength to secure one or more slabs to the support frame 102.

Slab securement tool 100 has a weight that promotes ready handling and installation, while providing a robust construction that is durable and has an extended useful life (e.g., through many cycles of installing and removing from a support frame). In an example embodiment, slab securement tool 100 has a weight less than 20 pounds, less than 15 pounds, less than 10 pounds, less than 8 pounds, less than 5 pounds, or less. For example, slab securement tool 100 has a weight between 2 pounds and 20 pounds, 5 pounds and 12 pounds, or between about 7 pounds and 10 pounds. Such relatively low weights are promoted by the structural features described herein that facilitate secure attachment to a support frame while the weight of one or more slabs remain on the support frame (e.g., the slab securement tool 100 does not bear the weight of slabs over a continuous or prolonged period while in a slab-securing configuration).

Figure 7:
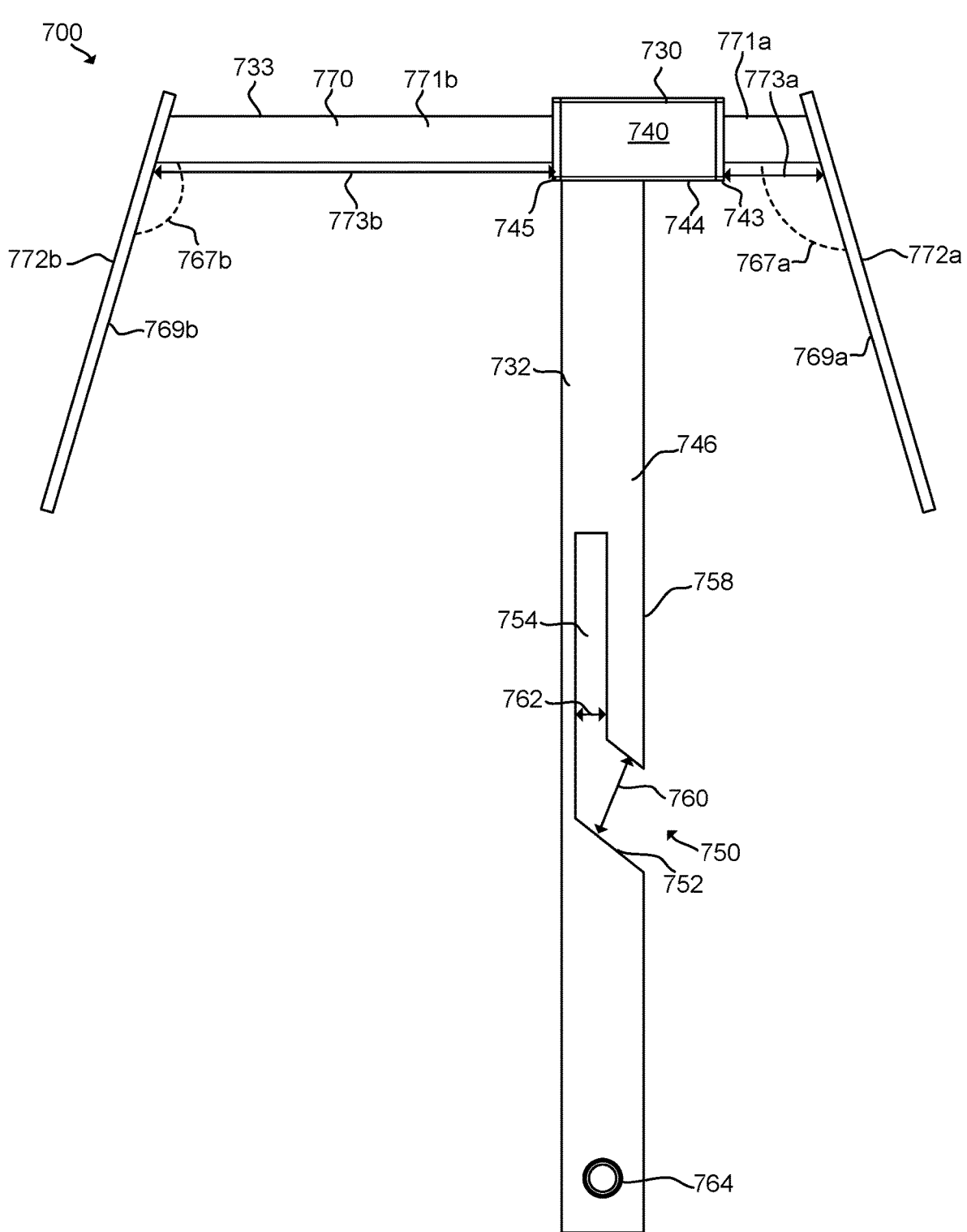
FIG. 7 is a side view of an example slab-securement tool, in accordance with some embodiments.
Figure 8:
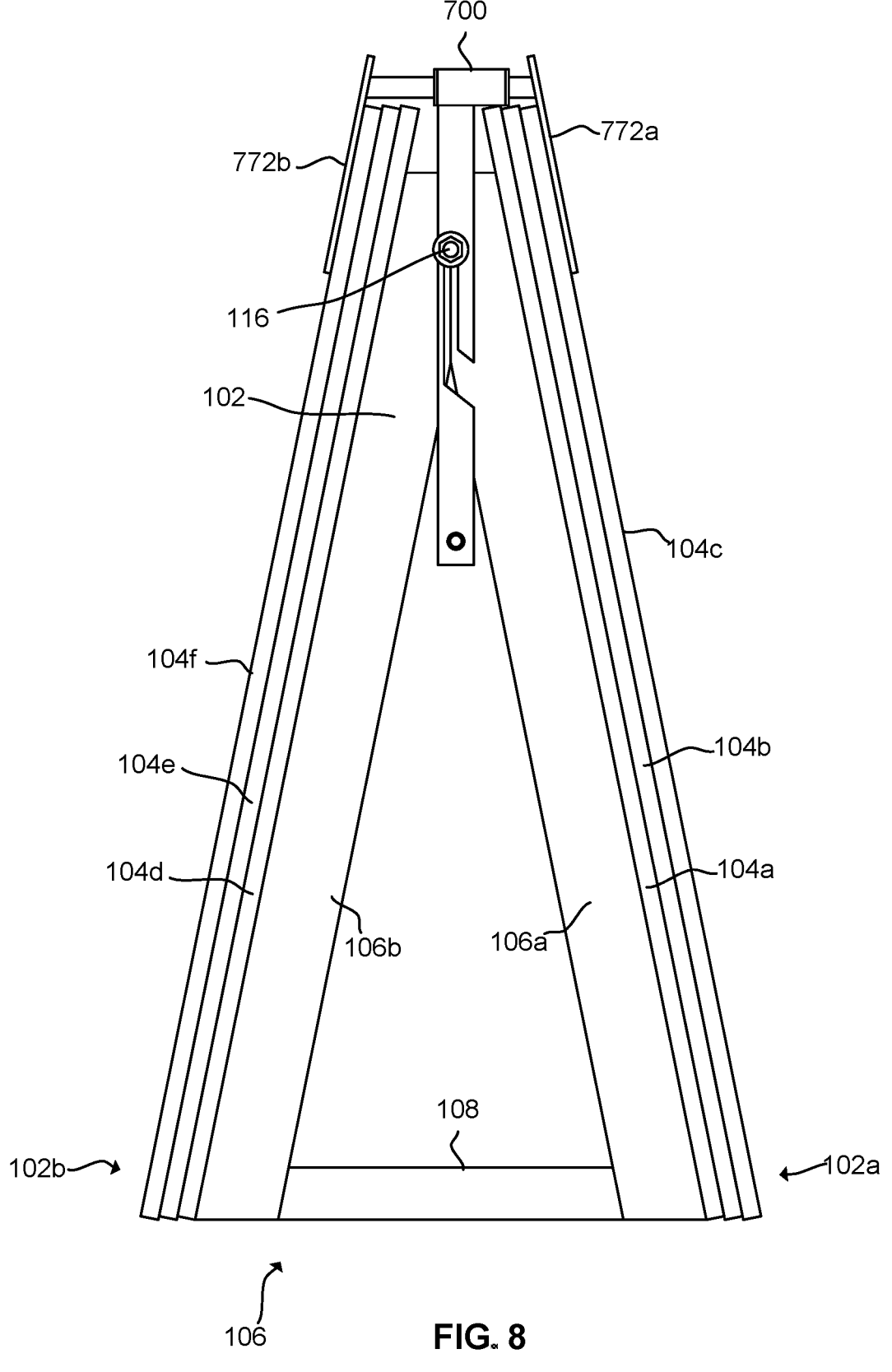
FIG. 8 is a side view of the example slab securement tool of FIG. 7 connected to a support frame, in accordance with some embodiments.

Referring to FIGS. 7 and 8, an example slab securement tool 700 is shown. Slab securement tool 700 secures one or more slabs located on opposed sides of the support frame (e.g., to a side of the beam 106a and to a side of the beam 106b). In some embodiments, the slab securement tool 700 includes one or more features with the slab securement tool 100 described with reference to FIGS. 1-6. For example, the slab securement tool 700 includes a frame 730 (e.g., having one or more features of frame 130), a housing 740 (e.g., having one or more features of housing 140), and a bracket 732 (e.g., having one or more features of bracket 132). In some embodiments, the housing 740 has a first end 743 and a second end 745 (e.g., having one or more features of the first end 143 and the second end 145).

The slab securement tool 700 includes an arm 733 (e.g., having one or more features of the arm 133). In some embodiments, the arm 733 includes a first arm portion 770 (e.g., having one or more features of first arm portion 170), a first end portion 772a (e.g., having one or more features of first end portion 172), and a second end portion 772b. The arm 733 that extends to contact, and/or be slightly spaced from, an outermost slab (e.g., slab 104c in FIG. 1 or slab 104d in FIG. 2) on both sides of the support frame. The first arm portion 770 extends from the bracket 732 and the frame 730 in a direction transverse to the direction of the bracket 732. The first end portion 772a and the second end portion 772b are each angled with respect to the first arm portion 770, the bracket 732, and the frame 730.

Each end portion 772a, 772b extends from the first arm portion 770 that includes a first member 771a (e.g., first bar) and a second member 771b (e.g., second bar). Each end portion 772a, 772b extends from the first and second members 771a, 771b, respectively at respective angles 767a, 767b. In some embodiments, each angle 767a, 767b is between 0 and 90 degrees, between 10 and 80 degrees, between 20 and 70 degrees, between 30 and 60 degrees, between 40 and 50 degrees, between 30 and 50 degrees, between 40 and 60 degrees, or about 45 degrees. In some embodiments, the angles 767a, 767b are similar angles or about equal to each other. In some embodiments, the angles 767a, 767b are different angles, or non-equal angles.

The arm 733 is adjustable relative to the frame 730 and the bracket 732. For example, the arm 733 is translatable to extend each end portion 772a, 772b further from the frame 730 and the bracket 732 and to retract each end portion 772a, 772b nearer to the frame 730 and the bracket 732. The arm 733 is lockable and adjustable to a plurality of positions. For example, the arm 733 can include a distance 773*a* from the first end 743 of the housing 740 to the first end portion 772*a* that is adjustable, and the arm 733 can include a distance 773*b* from the second end 745 of the housing 740 to the second end portion 772*b* that is independently adjustable from the distance 773*a*.

The arm 733 facilitates the independent adjustment of each of the distances 773*a*, 773*b*. For example, the first member 771*a* and the second member 771*b* are connected to each other in a telescoping arrangement where one of the first member 771*a* and the second member 771*b* is inserted into the other bar to facilitate independent extension and retraction of the distances 773*a*, 773*b*. In some embodiments, the first member 771*a* and the second member 771*b* are offset from each other and pass through separate and independent openings in the frame 730 to facilitate independent extension and retraction of the distances 773*a*, 773*b*.

In some embodiments, the end portions 772*a*, 772*b* each extend to distances 773*a*, 773*b* that are between 3 and 20 inches, between 4 and 15 inches, between 5 and 10 inches, or about 8 inches. The distances 773*a*, 773*b* are independently adjustable. In some embodiments, the distances 773*a*, 773*b* are equal or approximately the same (e.g., to accommodate the same number of slabs on each side). In other embodiments, the distances 773*a*, 773*b* are non-equal and differ from each other (e.g., to accommodate different numbers of slabs on each side). Inner surfaces 769*a*, 769*b* (e.g., having one or more features of inner surface 169) of the end portions 772*a*, 772*b* are configured to contact, and/or be slightly spaced from, an outer surface of the outer most slabs (e.g., slabs 104*c* and 104*f* in FIG. 8). The inner surfaces 769*a*, 769*b* can include padding to facilitate protection for the plurality of slabs that are secured by the slab securement tool 700.

In some embodiments, the first end portion 772*a* and the second end portion 772*b* are independently rotatable from each other. For example, the first bar 771*a* and the first end portion 772*a* are rotatable with respect to the frame 730 and the bracket 732. The second bar 771*b* and the second end portion 772*b* are rotatable with respect to the frame 730 and the bracket 732. In some embodiments, the first end portion 772*a* is rotated so the first end portion 772*a* is oriented in a generally upright direction (e.g., approximately 180 degrees from the embodiment shown in FIG. 8) to release contact, and/or provide additional clearance, between the first end portion 772*a* and the outer most slab 104*c*. The second end portion 772*b* remains in a generally downward position to secure the slabs 104*d*-104*f* while the first end portion 772*a* is rotated. With the first end portion 772 rotated in a generally upright direction, the slabs 104*a*-104*c* can be removed from the support frame 102 or additional slabs can be added to the first side 102*a*. While the example of the first end portion 772*a* is described, similar steps are applicable to the second end portion 772*b* independent from the rotational position of the first end portion 772*a*. In some embodiments, the first bar 771*a* and the second bar 771*b* are biased to return to the secured configuration (e.g., with the first end portion 772*a* and second end portion 772*b* oriented in a generally downward direction). For example, the end portions 772*a*, 772*b* of the arm 733 are biased by gravity that acts on the end portions 772*a*, 772*b* to return the end portions 772*a* and 772*b* of the arm 733 generally downward.

While the slab securement tool 700 is in the secured position with the outermost slab generally upright, the slab securement tool 700 facilitates reduced or no forces on the end portions 772*a*, 772*b* and facilitates support of the one or more slabs by the support frame 102. In some embodiments of the secured position, the slab securement tool 700 facilitates that no forces are exerted by the one or more slabs on the end portions 772*a*, 772*b*. The construction of the slab securement tool 700 includes a relatively lightweight construction, while maintaining the securement abilities described herein. The slab securement tool 700 is generally not loaded when in the secured configuration.

In some embodiments, the slab securement tool 700 includes one or more materials. For example, the slab securement tool 700 includes one of aluminum, iron, steel, plastic, carbon fiber, or combinations thereof. The slab securement tool 700 is readily formable using a variety of techniques including stamping, 3D printing, molding, welding, and/or lathing. In some embodiments, the slab securement tool 700 includes aluminum to facilitate a lightweight and readily formable structure that is resistant to corrosion while maintaining strength to secure one or more slabs to the support frame 102. In some embodiments, the slab securement tool 700 includes steel to facilitate manufacturability (e.g., via stamping, 3D printing, welding, lathing) of a weighted structure that provides strength to secure one or more slabs to the support frame 102. In some embodiments, the slab securement tool 700 includes plastic to facilitate a lightweight and readily formable (e.g., via molding, 3D printing, welding, lathing) structure that is resistant to corrosion while maintaining strength to secure one or more slabs to the support frame 102. In some embodiments, the slab securement tool 700 includes carbon fiber to facilitate a lightweight structure that is resistant to corrosion and having strength to secure one or more slabs to the support frame 102.

Figure 9:
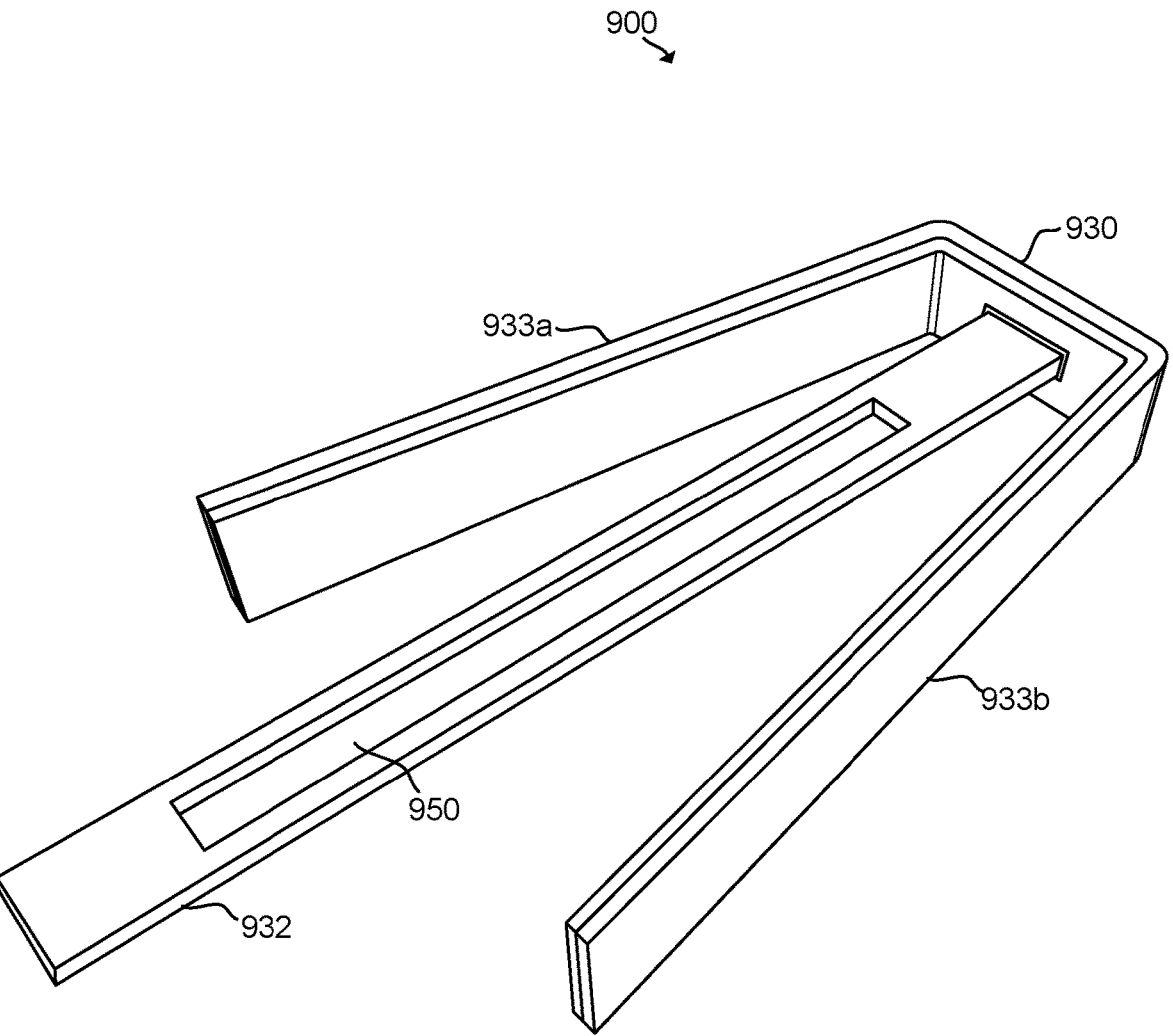
FIG. 9 is a perspective view of an example slab securement tool, in accordance with some embodiments.
Figure 10:
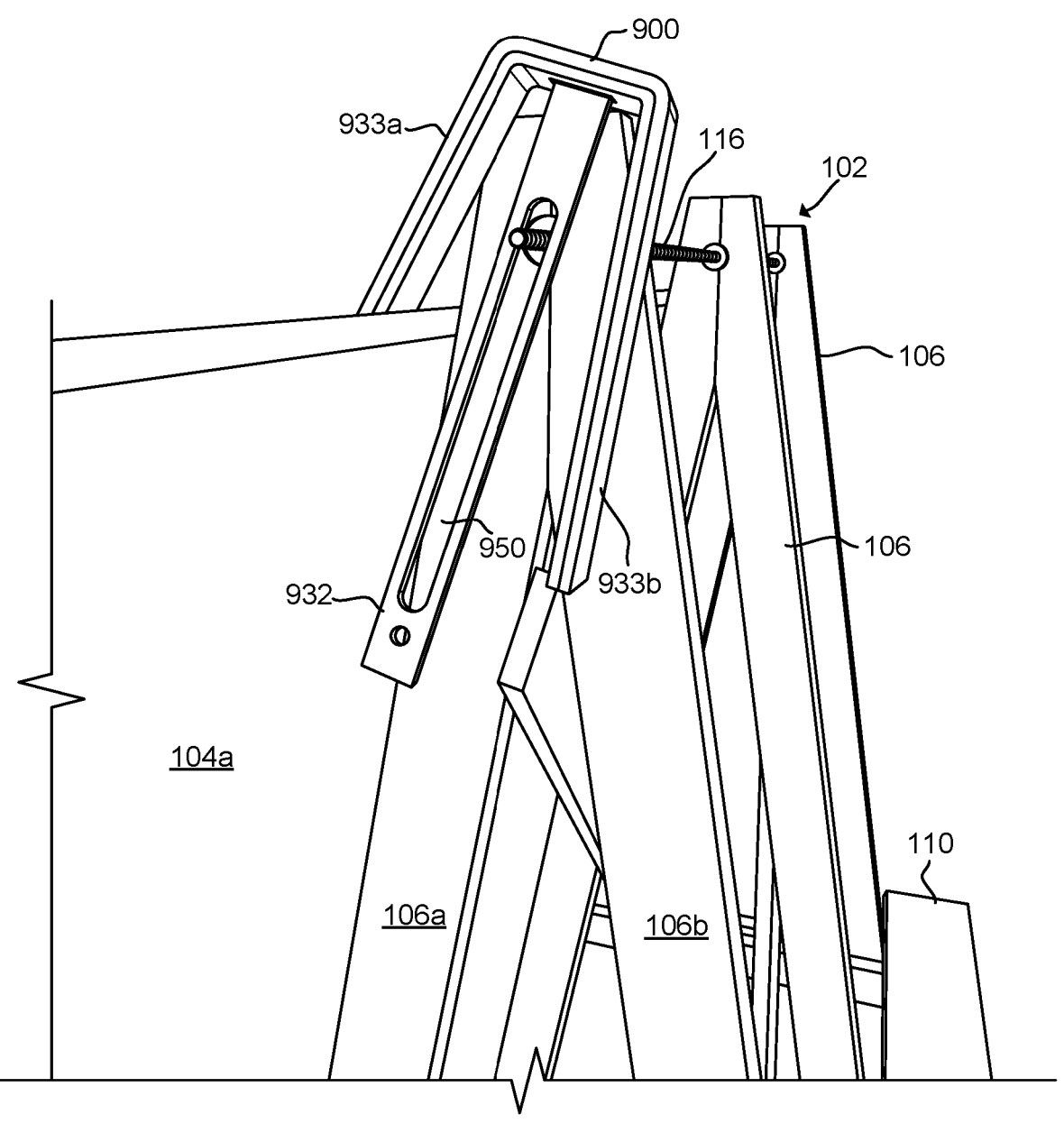
FIG. 10 is a perspective view of the example slab securement tool of FIG. 9 connected to a support frame, in accordance with some embodiments.
Figure 11:
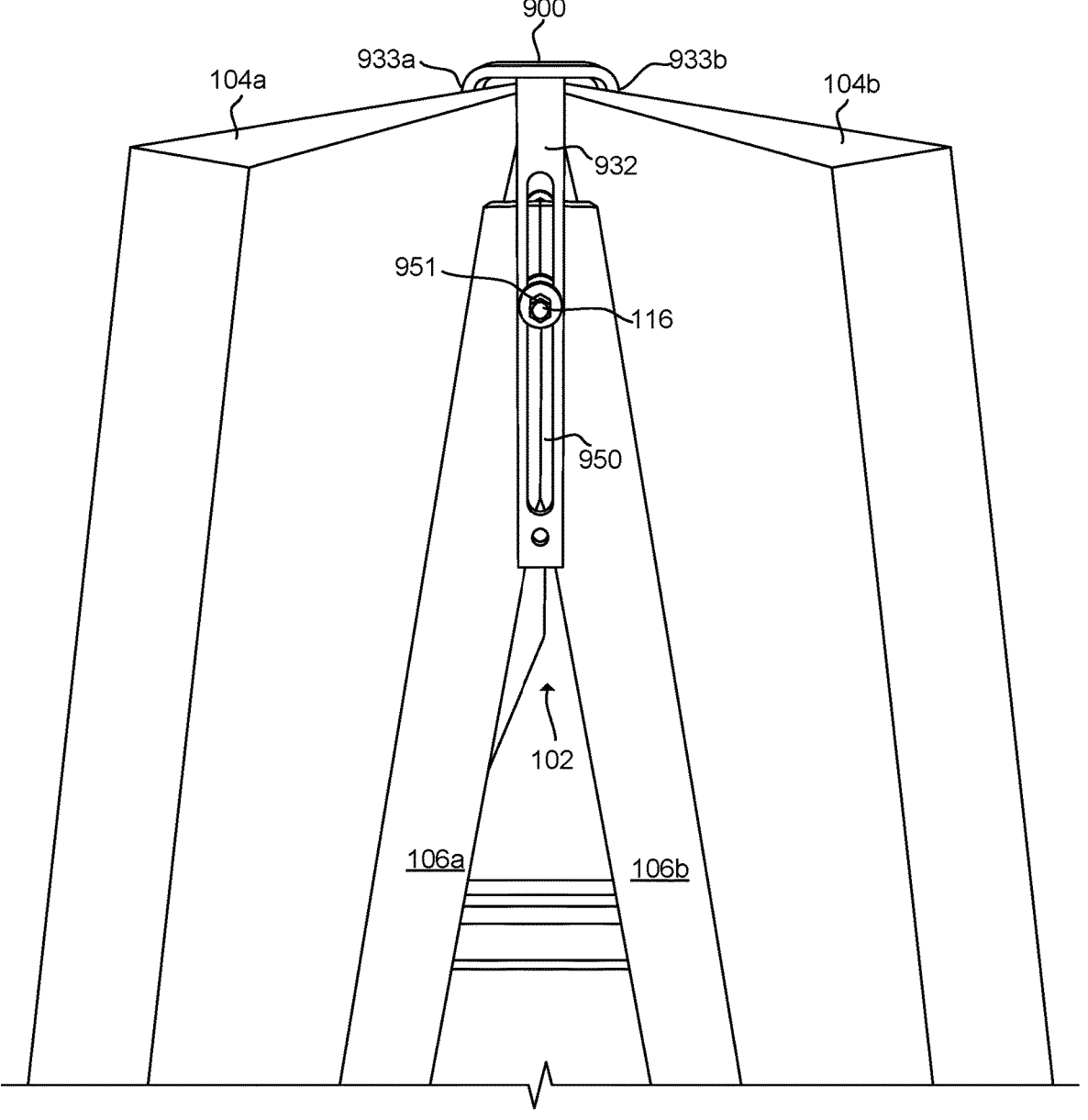
FIG. 11 is a perspective view of the example slab securement tool of FIG. 9 connected to a support frame, in accordance with some embodiments.

Referring to FIGS. 9-11, an example slab securement tool 900 is shown. In some embodiments, the slab securement tool 900 has one or more fixed arms that secure one or more slabs to one side or two sides of the support frame 102. The slab securement tool 900 secures one or more slabs to one side or two sides (e.g., to a side of the beam 106*a* and/or to a side of the beam 106*b*) of the support frame 102. In some embodiments, the slab securement tool 900 includes a frame 930, an arm 933*a*, and a bracket 932 that are integrally formed with each other such that the slab securement tool 900 is a single piece. In some embodiments, the slab securement tool 900 includes two arms 933*a*, 933*b* that are fixed with respect to the frame 930 and the bracket 932. In some embodiments, the frame 930 and the arms 933*a*, 933*b* are an integral piece of shaped material that is bonded, welded, or otherwise connected to the bracket 932 to provide the frame 930, the bracket 932, and the arms 933*a*, 933*b* as one piece.

Each arm 933*a*, 933*b* extends from the frame 930 at respective angles. In some embodiments, each arm 933*a*, 933*b* is angled with respect to the frame 930, each angle is between 0 and 90 degrees, between 10 and 80 degrees, between 20 and 70 degrees, between 30 and 60 degrees, between 40 and 50 degrees, between 30 and 50 degrees, between 40 and 60 degrees, or about 45 degrees. In some embodiments, the angles are similar angles or about equal to each other. In some embodiments, the angles are different angles, or non-equal angles.

The bracket 932 extends from the frame 930 and is configured to connect the slab securement tool 900 to a portion of the support frame 102. The bracket 932 is arranged transverse to the frame 930. In an installed configuration (see e.g., FIGS. 10 and 11), the bracket 932 extends downwardly away from the bottom surface of the frame 930. The bracket 932 includes a channel 950 that extends along a length of the bracket 932. In an embodiment, the channel 950 extends along a portion of the length of the bracket 932. In another embodiment, the channel 950 extends along substantially the entire length of the bracket 932. The channel 950 is configured to connect to a portion of the support frame 102. For example, the channel 950 is configured to receive and connect to the cross bar 116 (see e.g., FIGS. 10 and 11).

In some embodiments, the slab securement tool 900 is attachable to the support frame 102 to secure one or more slabs (e.g., slabs 104a, 104b) to the support frame 102. The cross bar 116 is received in the channel 950 to connect the slab securement tool 900 to the support frame 102. The arms 933a, 933b extend around an outermost slab (e.g., slabs 104a, 104b) to operably couple the slabs to the support frame 102.

In operation, one or more slabs (e.g., the plurality of slabs 104) are positioned at the support frame 102. The support frame 102 provides a support for one or more slabs in an angled or non-horizontal orientation, such as a substantially upright position. Some embodiments include a platform (e.g., such as platform 110) that extends from or near base members (e.g., such as base members 108). In some embodiments, the platform can include a cleat (e.g., such as a cleat 114) that can constrain the bottom surface of the plurality of slabs from movement, rotation, or slip away from the support frame. The slab securement tool 900 is operable from a readily accessible position, such as at the top and/or front of the plurality of slabs 104. The slab securement tool 900 is oriented to receive the cross bar 116 in the channel 950 to connect the bracket 932 to the support frame 102. For example, the slab securement tool 900 is lowered between slabs 104a and 104b and slid laterally so that the crossbar 116 is received through the channel 950. A restraint 951 (e.g., a fastener such as a nut and washer) is then attached to the support frame 102 (e.g., crossbar 116) to constrain lateral movement of the slab securement tool 900. The restraint 951 is easily attachable to the support frame 102 (e.g., at the cross bar 116) by a single operator (e.g., by hand while the operator is installing the slab securement tool 900. The extended length of the channel 950 allows the tool to be raised (e.g., by an operator) to move the slab securement tool 900 out of a secured configuration so that a slab can be removed or placed on the support frame 102. The slab securement tool 900 is lowered to return to the secured configuration. The slab securement tool 900 is biased into the secured configuration. For example, the slab securement tool 900 is biased via gravity to lower or drop the slab securement tool 900 into the secured configuration. The slab securement tool 900 facilitates an intuitive and efficient installation process with few or no moving parts. The operator is able to rapidly install the slab securement tool 900 to quickly and securely lock one or more slabs to the support frame 102.

While the slab securement tool 900 is in the secured position with the outermost slab(s) generally upright, the slab securement tool 900 facilitates reduced or no forces on the arms 933a, 933b and facilitates support of the one or more slabs by the support frame 102. In some embodiments of the secured position, the slab securement tool 700 facilitates that no forces are exerted by the one or more slabs on the arms 933a, 933b. The construction of the slab securement tool 900 includes a relatively lightweight construction, while maintaining the securement abilities described herein. The slab securement tool 900 is generally not loaded when in the secured configuration.

In some embodiments, the slab securement tool 900 includes one or more materials. For example, the slab securement tool 900 includes one of aluminum, iron, steel, plastic, carbon fiber, or combinations thereof. The slab securement tool 900 is readily formable using a variety of techniques including stamping, 3D printing, molding, welding, and/or lathing. In some embodiments, the slab securement tool 900 includes aluminum to facilitate a lightweight and readily formable structure that is resistant to corrosion while maintaining strength to secure one or more slabs to the support frame 102. In some embodiments, the slab securement tool 900 includes steel to facilitate manufacturability (e.g., via stamping, 3D printing, welding, lathing) of a weighted structure that provides strength to secure one or more slabs to the support frame 102. In some embodiments, the slab securement tool 900 includes plastic to facilitate a lightweight and readily formable (e.g., via molding, 3D printing, welding, lathing) structure that is resistant to corrosion while maintaining strength to secure one or more slabs to the support frame 102. In some embodiments, the slab securement tool 900 includes carbon fiber to facilitate a lightweight structure that is resistant to corrosion and having strength to secure one or more slabs to the support frame 102. The slab securement tool 900 facilitates an efficient manufacturing process with few or no moving parts.

Although a few implementations have been described in detail above, other modifications are possible. For example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A stone slab securement tool for securing a stone slab to a stone slab support frame, comprising:
   a tool frame;
   a bracket that extends downwardly from the tool frame, the bracket including a channel configured to connect to a portion of a stone slab support frame, wherein the channel comprises a first portion and a second portion, the second portion having a width that is less than a width of the first portion; and
   an arm including a first arm portion that extends transverse from the bracket and an end portion that is angled with respect to the first arm portion and the bracket, the arm adjustable relative to the tool frame and the bracket into a slab-securing configuration in which the end portion is non-parallel with the bracket.

2. The stone slab securement tool of claim 1, wherein the end portion has an angle of about 45 degrees with respect to the first arm portion.

3. The stone slab securement tool of claim 1, wherein the first portion of the channel is arranged at a non-zero angle with respect to an edge of the bracket.

4. The stone slab securement tool of claim 1, wherein the second portion of the channel is arranged parallel to an edge of the bracket.

5. The stone slab securement tool of claim 1, wherein the first arm portion includes a plurality of openings that are configured to receive a fastener.

6. The stone slab securement tool of claim 1, further comprising a bar that extends through a bottom end of the bracket.

7. The stone slab securement tool of claim 6, wherein the bracket comprises a first plate and a second plate, the first plate and second plate arranged orthogonal to each other, wherein the bar extends equal distances on each side of the first plate.

8. The stone slab securement tool of claim 1, further comprising a housing including an aperture, wherein the first arm portion extends at least partially through the aperture.

9. The stone slab securement tool of claim 1, wherein the arm further comprises a plurality of openings spaced along a length of the arm.

10. The stone slab securement tool of claim 9, further comprising a fastener configured to operably couple to at least one of the plurality of openings.

11. The stone slab securement tool of claim 1, wherein the first arm portion is cylindrical.

12. The stone slab securement tool of claim 1, wherein the first portion and the second portion of the channel create an aperture in the bracket.

13. A method of securing one or more slabs to a support frame, the method comprising:

receiving a cross bar of a support frame in a channel of a bracket of a slab securement tool, wherein the channel comprises a first portion and a second portion, the second portion having a width that is less than a width of the first portion, the slab securement tool including an arm that has a first arm portion that extends transverse from the bracket and an end portion that is angled with respect to the first arm portion and the bracket; and receiving a fastener in one of a plurality of openings in the first arm portion, thereby locking the arm of the slab securement tool.

14. The method of claim 13, further comprising actuating to an unlocked configuration in which the fastener is removed from one of a plurality of openings in the first arm portion.

15. The method of claim 13, further comprising rotating the arm to release the end portion from an outer most slab of the one or more slabs.

16. The method of claim 13, wherein the end portion has an angle of about 45 degrees with respect to the first arm portion.

17. The method of claim 13, wherein the first portion of the channel is arranged at an angle with respect to an edge of the bracket.

\* \* \* \* \*